United States Patent [19]

Shiwaku et al.

[11] 4,033,175
[45] July 5, 1977

[54] GAS LEAKAGE MEASURING DEVICE

[75] Inventors: Takayuki Shiwaku; Takeshi Miyazaki, both of Kure, Japan

[73] Assignee: Mitutoyo Manufacturing Co., Ltd., Tokyo, Japan

[22] Filed: May 11, 1976

[21] Appl. No.: 685,363

[30] Foreign Application Priority Data

Sept. 22, 1975 Japan .......................... 50-114974

[52] U.S. Cl. .............................................. 73/49.2
[51] Int. Cl.² ........................................ G01M 3/32
[58] Field of Search ...................... 73/40, 49.2, 49.3

[56] References Cited

UNITED STATES PATENTS

| | | | |
|---|---|---|---|
| 2,924,965 | 2/1960 | Westerheim | 73/40 |
| 3,839,900 | 10/1974 | Fukuda | 73/49.3 |

Primary Examiner—Richard C. Queisser
Assistant Examiner—Joseph W. Roskos
Attorney, Agent, or Firm—Spensley, Horn and Lubitz

[57] ABSTRACT

An apparatus for measuring gas leakage including a hollow container having a gas inlet port which is connected to a reference pressure gas supply via a valve and another gas outlet port that is connected to a test container; a liquid container located in the hollow container, a balance mechanism mounted within the hollow container which is maintained in equilibrium by an inverted floating cup that is attached to the underside of the balance beam and which is immersed in a liquid contained in the liquid container, a supply pipe that introduces gas at a reference pressure into the floating cup, a detector which detects the inclination of the balance mechanism and generates a signal corresponding thereto, a measuring device that measures the displacement of the floating cup as a function of the signal from the detector, and a restoring means that will restore the equilibrium of the tilted balance beam.

3 Claims, 3 Drawing Figures

GAS LEAKAGE MEASURING DEVICE

BACKGROUND OF THE INVENTION

1. Field of invention

This invention relates to an apparatus for measuring the gas leakage of a container and more particularly to apparatuses for measuring gas leakage of a container utilizing balance beams.

2. Prior Art

It is frequently necessary to measure the gas tightness of containers which are used to store gases under pressure. Among the various devices that exists in the prior art for measuring gas leakage, the ones that utilize a balance mechanism and the pressure difference between the inside and outside of a floating cup coupled to the balance mechanism are most suitable for precision measurement. Gas leakage in such devices is measured by connecting the container to be measured to the apparatus, introducing a reference pressure inside the floating cup, introducing a pressure outside the cup and in the container to be checked, balancing the balance mechanism and measuring the amount that the floating cut rises caused by the increased force acting on the floating cup in response any decrease in the gas pressure outside the cup as a result of a leakage in the test container. However, since leakage measurement of gases in a container is a continuous operation, it is conducted in the prior art cyclically in the following manner: After the first measurement, the gas at the preference pressure inside the cup is released to reset the balance beam to the equilibrium, horizontal position and the previous described measurement steps are repeated again. From these cyclic measurements the amount of leakage is approximated from the period of repetition of the measurements.

Since the amount of gas leakage is approximated from the period of repetition, it is difficult to achieve a measurement of gas leakage which has a high precision. Furthermore, in such devices, the pressure difference between the inner and outer surfaces of the floating cup due to the unbalance of the balance beam constitutes a source of error in the quantitive measurements.

SUMMARY OF THE INVENTION

Accordingly it is a general object of the present invention to provide an apparatus for measuring gas leakage that is extremely sensitive and provides a precise quantitative measure of the quantity of gas leakage.

In keeping with the principals of the present invention, the objects are accomplished with the unique combination comprising a hollow container having a gas inlet port which is connected to a reference pressure gas supply via a valve and another gas outlet port which is connected to a test container, a liquid container located within the hollow container, a balance mechanism mounted within the hollow container which is maintained at equilibrium by an inverted floating cup that is attached to the underside of the balance beam and which is immersed in a liquid containing the liquid container, a supply pipe that introduces gas at a reference pressure into the floating cup, a detector which detects the inclination of the balance mechanism and generates a signal corresponding thereto, a measuring device that measures the displacement of the floating cup as a function of the signal from the detector, and a restoring means which restores the equilibrium of the tilted balance beam. To measure the amount of leakage in test container, a reference gas is introduced underneath within the following cup and within the hollow container and the balance mechanism is balanced. The amount of rise of the floating cup due to leakage of gas in the test container is detected by the detector and measured by the measuring device. The balance of the balance mechanism is then restored to an equilibrium position by the restoring means and the measurement is repeated.

BRIEF DESCRIPTION OF THE DRAWINGS

The above mentioned and other features and objects of the present invention will becomes more apparent by reference to the following description taken in conjunction with the accompanying drawings, wherein like reference numerals denote like elements and in which.

DETAILED DESCRIPTION OF THE INVENTION

Figure 1:
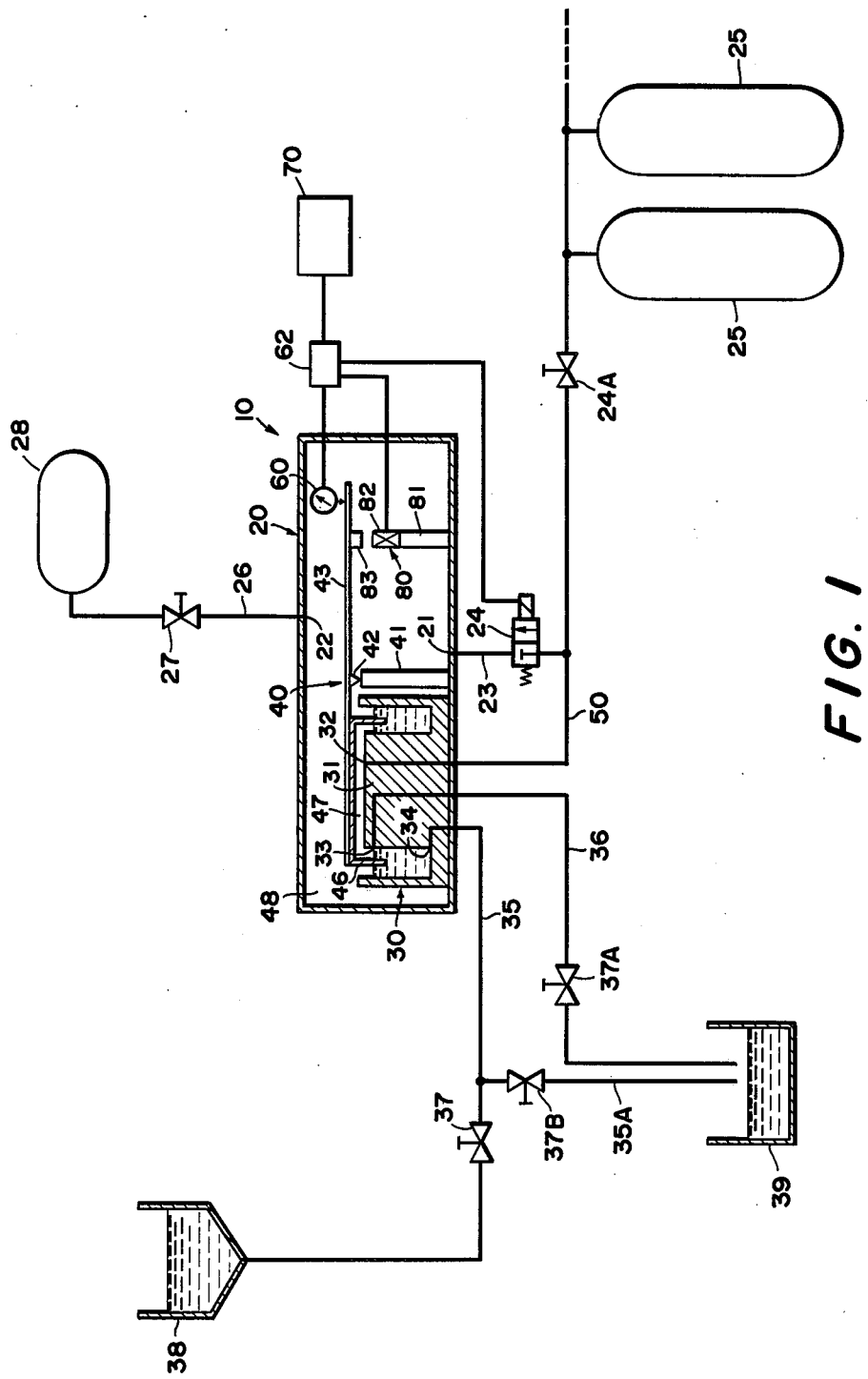
FIG. 1 is a diagram of a gas leakage measuring device in accordance with the teachings of the present invention.
Figure 2:
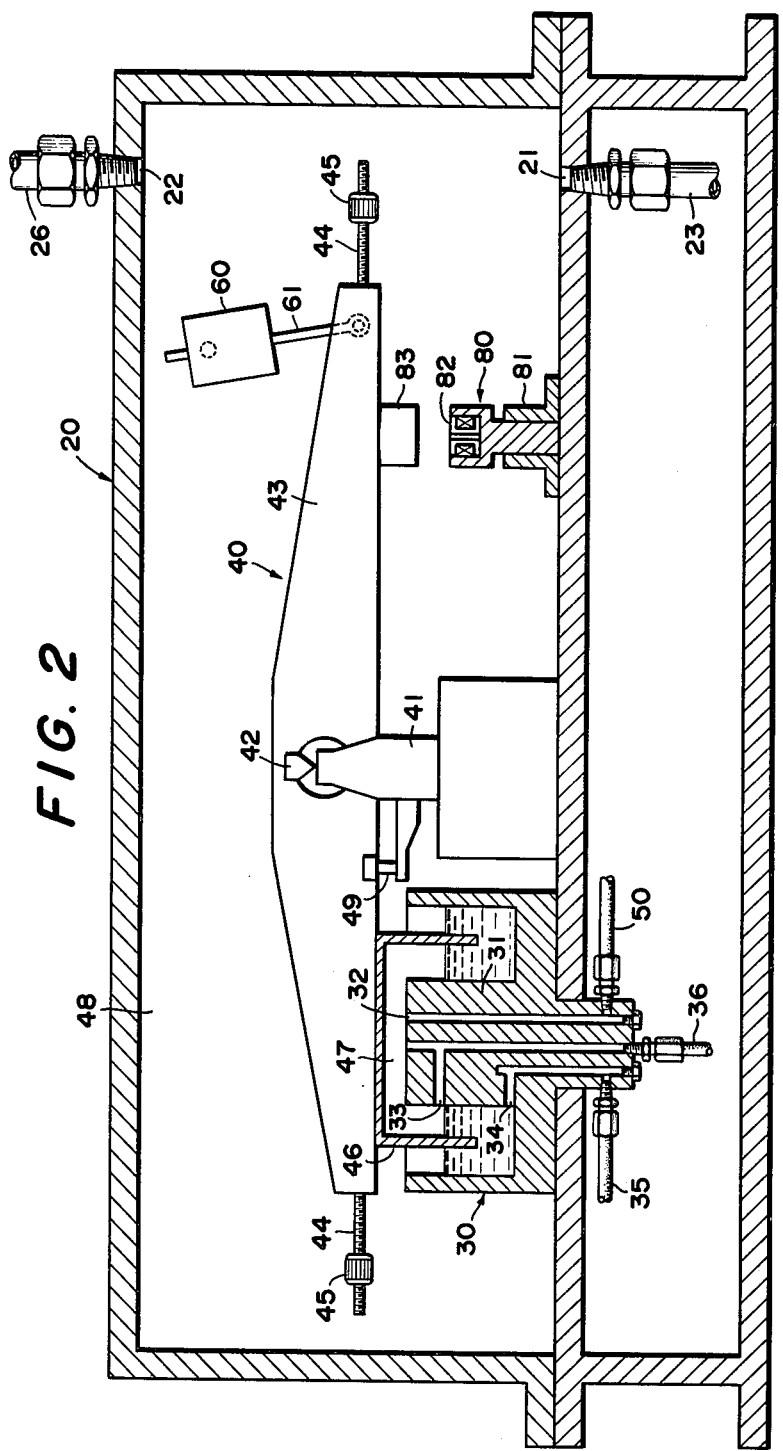
FIG. 2 is a sectional view of the hollow container of FIG. 1.

Referring to FIGS. 1 and 2, shown therein is a gas leakage measuring device in accordance with the teachings of the present invention. The gas leakage measuring device 10 comprises a hollow container 20, a liquid container 30 which is located within hollow container 20, a balance mechanism 40 contained within hollow container 20, a conduit 50 coupled to hollow container 20 supplying a reference pressure gas, a detector 60, a measuring means 70 and a restoring mechanism 80.

The hollow container 20 is made of thin plate with openings for inlet 21 for reference pressure gas in the lower part and an outlet 22 in the upper part. Inlet 21 is connected to a gas supply unit 25 of reference pressure gas by a gas pipe 23 via electromagnetic valve 24 and mechanical valve 24A. Gas outlet 22, on the other hand, is connected to a test container 28 by a gas pipe 26 via mechanical valve 27.

Liquid container 30 is contained within hollow container 20. The central portion 31 of liquid container 30 is of the same height as the outer upper edge of liquid container 30. Inlet port 32 for reference pressure gas is provided in the upper surface of central portion 31 while liquid exit port 33 is provided near the upper edge of the side wall. Inlet port 34 for liquid is provided in the bottom of liquid container 30. Inlet port 32 is coupled to gas supply unit 25 conduit pipe 50 and valve 24A. Inlet port 34 is connected to liquid tank 38 which is outside hollow container 20 by pipe 35 via valve 37. The elevation of liquid tank 38 is higher than that of liquid container 30 so that the liquid contained in liquid tank 30 will flow into liquid container 30 when the valve 37 is opened. Pipe 36 is connected to exit port 33 and extends down to drain tank 39 via valve 37A which is also located outside hollow container 20. Liquid exit port 33 permits draining of a portion of the liquid in the liquid container 30 that is at a higher elevation than exit port 33 when valve 37A is opened. Drain cock 37B is coupled to pipe 35 and pipe 35A extends from drain cock 37B to drain tank 39. Balance mechanism 40 comprises a balance beam 43 which is supported on an edge support 41 via a knife edge 42. Edge support 41 is installed in the central portion of hollow container 20 and screws 44 are provided at both ends of beam 43 onto which balance weights 45 are screwed. Inverted floating cup 46 is attached to the underside of balance beam 43. The opening of floating cup 46 is of a size to fit within the space between the outside of liquid container 30 and its central portion 31. Furthermore, the depth of cup 46 is such that the bottom edge of the cup will remain in contact with the fluid in liquid container 30 even when the balance beam 43 tilts and floating cup 46 raises to its uppermost position. Because floating cup 46 is always in contact with the liquid in liquid container 30, floating cup 46 divides the internal space of hollow container 20 into a cup chamber 47 within the floating cup, and a container chamber 48. The balance mechanism 40 is so constructed that it can be balanced with floating cup 46 attached.

Detector 60 is a differential transformer, flexibly mounted inside hollow container 20. The core 61, one end of which is flexibly coupled to, and of said balance beam 43, is slidably inserted into detector 60. A tilt in balance beam 43, that is an upward displacement of floating cup 46, is measured by detector 60 as a voltage change. The voltage change is transmitted to a regulator 62. Regulator 62 is electrically coupled to a measuring apparatus 70 to measure the tilt of the balance beam 43 as a function of time.

The restoring device 80 of balance beam 40 comprises a support 81, and electro magnetic coil 82 mounted on the support 81, and a magnet 83 attached to the underside of balance beam 43. The device is excited by a control signal which the regulator 62 emits when the tilt of the balance beam reaches a prescribed magnitude, and it returns the balance beam 43 to a horizontal position by repulsive force between the coil 82 and the magnet 83. Stopper 49 which is fixed to the edge support 41 engages with balance beam 43 when balance beam 43 is horizontal, and prevents any further counter clockwise rotation of balance beam 43. Furthermore, electro magnetic valve 24 is electrically connected to and controlled by regulator 62. In practice, the circuits that comprise regulator 62 are well known in the art, and the design of regulator 62 is within the knowledge of a person skilled in the art.

In operation, balance mechanism 40 is set at equilibrium by adjusting the balance weights 45 with valves 24A, 27, 37, 37A, 37B, and electro magnetic valve 24 closed. Valves 37 and 37A are then open to admit liquid into liquid container 30. Since the liquid container has liquid exit port 33 on the side wall of its central portion 31, the liquid level will stay at this height without rising further. The valves 37 and 37A, are then closed when the liquid reaches the point. As for the liquid used, a sealing fluid with low viscosity and low volatility is preferred. Valve 24A and 27 are then opened. Electro magnetic valve 24 is open by a control signal from regulator 62 to equalize the pressure between the chamber 47 under floating cup 43, the chamber 48, test container 28 and the reference pressure gas supply unit 25. Regulator 62 then excites electro magnetic coil 82, thus repelling magnet 83 of balance beam 43, thereby placing balance beam 43 in a horizontal position. The signal from regulator 62 to electro magnetic coils 82 is terminated after closing valve 24, and the inclination of balance beam 43 is measured by measuring apparatus 70. It is desirable to start this measurement after waiting for the level in container 30 to stabilize or the inclination of the balance beam to become stationary.

If there is a leak in the test container 28, the pressure in chamber 48 will decrease with time after the start of the measurement while the pressure in floating cup chamber 47 will remain constant. Accordingly, the pressure in chamber 47 will become relatively higher than the pressure in chamber 48, thereby causing floating cup 46 and the balance beam 43 to which it is attached to rise. The inclination of the balance beam 43 will keep increasing until a pressure equalization is achieved between floating cup chamber 47 and chamber 48. The pressure in chamber 48 is equal to that of the test container 28. The beam inclination is converted into a voltage change by detector 60 and the inclination is measured as a function of time by means of measuring apparatus 70.

When the inclination of balance beam 43 exceeds a prescribed limit, regulator 62 dispatches a signal to open electromagnetic valve 24, thus equalizing the pressures in test container 28 and chamber 48 with the pressure in the floating cup chamber 47 and the reference pressure gas supply unit 25. At the same time regulator 62 temporarily excites the coil 82 to bring the balance beam 43 back to the horizontal position and the measurement is resumed.

If there is a continuous leakage of gas in the test container 28, the actions described above will occur cyclically and the continuous operation is measured and recorded by the measuring device 70. Upon termination of the test, the liquid and liquid container 30 is extracted into drain tank 39 by opening drain cock 37 for the convenience of transporting the equipment.

Figure 3:
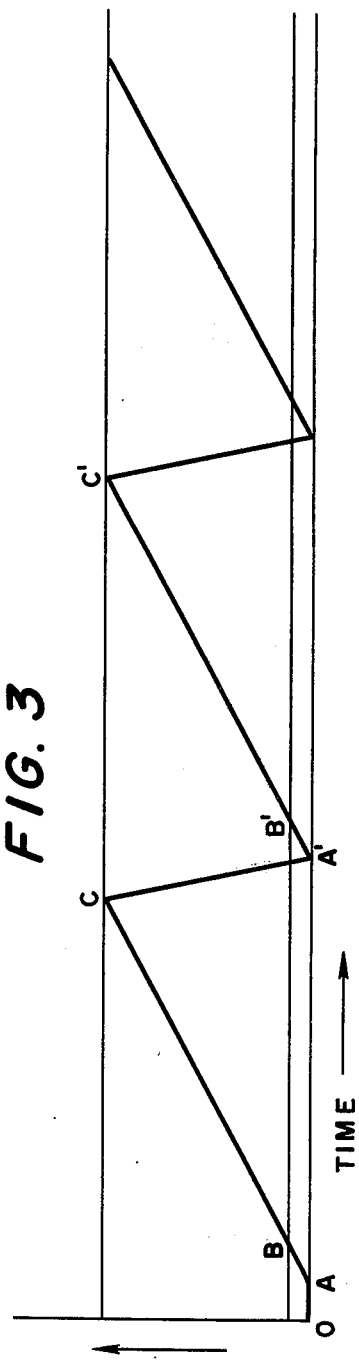
FIG. 3 is a graph showing an example of a measurement.

Referring to FIG. 3, shown therein as an example of a test result where the inclination of the balance beam 43 measured by measuring device 70 is plotted as a function of time. Point A in FIG. 3 is where the pressures of the test chamber 28, floating cup chamber 47 and chamber 48 are all brought to the same reference pressure and the balance beam 43 is in the horizontal position. As the balance beam tilts, the position of the floating cup 46 moves to points B and C. It is desirable to compute the amount of leakage beginning in the vicinity of point B with an upward motion of the floating cup stabilizes.

Point C in the figures where the balance beam 43 is returned to the horizontal position due to the action of restoring device 80 an point A time is where the restored floating cup resumes its upward motion.

By measuring the amount of rise of the floating cup in a span of time BC in the figure, the amount of leakage $\Delta L$ of the test container 28 over the time increment can be computed by the following relation.

$$\Delta L = \pi r^2 h (1 + V_2/V_1) \qquad (1)$$

Here $r$ is the radius of the floating cup, $h$ is its upward displacement, $V_1$ is the internal volume of the reference tank, and $V_2$ is the internal volume of the test container.

It should be apparent to one skilled in the art that even though the above described embodiment is prescribed in terms of restoring device 80 triggered by prescribed angle of inclination of balance beam 43, it is also possible to use a timer and to operate the restoring device 80 at a prescribed time after initiation of a measurement. Furthermore, it should be apparent that restoring device 80 is not limited only to electromagnetic repulsion devices but could be an electromagnetic attraction device by altering its placement or some other mechanical or other means that will restore the balance beam to a horizontal position. Furthermore, detecting device 60 is not limited to a differential type transformer, but could be a potentiometer, or a variable capacitor or any other means that will detect a displacement of the balance beam. In addition, the Application of the apparatus of the present invention is not limited to the measurement of gas leakage of a gas-tight container, but can also be used to test function of other test specimens such as open-closed systems, pipeline systems, and so on.

As stated above, the present invention, which is an apparatus for measuring gas leakage in which a hollow container is connected to a reference gas supply and a test container. A liquid container and a balance mechanism are mounted in the hollow container and inverted floating cup is attached to the underside of a balanced beam of a balanced mechansim and is immersed in the liquid container. A reference pressure gas is introduced by a conduit into the floating cup, and the upward displacement of the floating cup is detected by the detector and measured by the measuring device, and the equilibrium of the inclined balance beam is restored by a restoring device. This device eliminates the dead zone of measurement which has been unavoidable due to an unbalanced weight of the balance beam using conventional methods, and achieves a highly sensitive and accurate quantitative measurement of the gas leakage.

In all cases, it is understood that the above-described embodiment is merely illustrative of but one of many possible specific embodiments which represent the application of the principles of the present invention. Furthermore, numerous and varied other arrangements can be readily devised in accordance with the principles of the present invention by those skilled in the art without departing from the spirit and scope of the invention.

We claim:

1. An apparatus for measuring gas leakage of a test specimen comprising:
   a container having a gas inlet port and a gas outlet port, said outlet port being coupled to said test specimen;
   a liquid container provided in said container;
   a balance mechanism provided in said container, said balance mechanism comprising a balance beam which is normally in an equilibrium position;
   and inverted cup coupled to one end of said balance beam and floating in a liquid in said liquid container, said inside surface of said cup and the surface of said liquid defining a closed space;
   a supply of reference gas coupled to said inlet port and to said closed space within said inverted cup via a first valve means;
   a detector for detecting a deviation from said equilibrium position of said beam and for generating a signal corresponding to said deviation;
   a means for measuring said deviation as a function of said signal from said detector;
   means responsive to said signal from said detector for restoring said balance beam to said equilibrium position; and
   a normally closed second valve means for coupling said closed space to said container, said second valve means being responsive to said signal from said detector whereby said second valve means is actuated to couple said closed space to said container whenever said means for restoring causes said balance beam to return to said equilibrium position.

2. An apparatus for measuring gas leakage according to claim 1 wherein said detector comprises a differential transformer.

3. An apparatus for measuring gas leakage of a test specimen comprising:
   a container having a gas inlet port and a gas outlet port, said outlet port being coupled to said test specimen;
   a liquid container provided in said container;
   a balance mechanism provided in said container, said balance mechansim comprising a balance beam which is normally in an equilibrium position;
   an inverted cup coupled to one end of said balance beam and floating in a liquid in said liquid container, the inside surface of said cup and the surface of said liquid defining a closed space;
   a supply of reference pressure gas coupled to said inlet port via a valve and to said closed space within said inverted cup;
   a detector for detecting a deviation from said equilibrium position of said balance beam and for generating a signal corresponding to said deviation;
   a means for measuring said deviation as a function of said signal from said detector; and
   means responsive to said signal from said detector for restoring said balance beam to said equilibrium position, said restoring means comprising an electromagnetic coil provided in said container and a permanent magnet coupled to said balance beam adjacent said electromagnetic coil.

* * * * *